Figure 3:
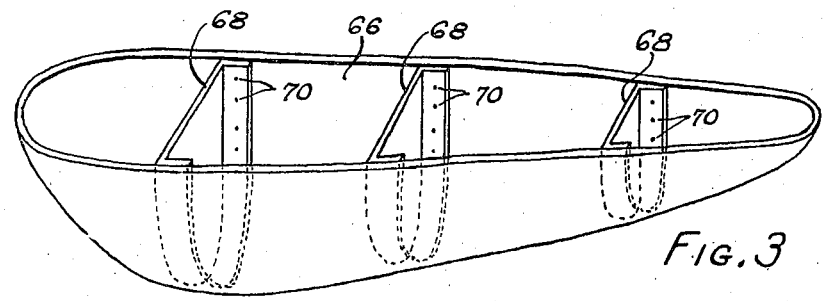

April 18, 1944. H. MAYS 2,346,932
SUPPORTING APPARATUS
Filed Dec. 12, 1942 2 Sheets-Sheet 1
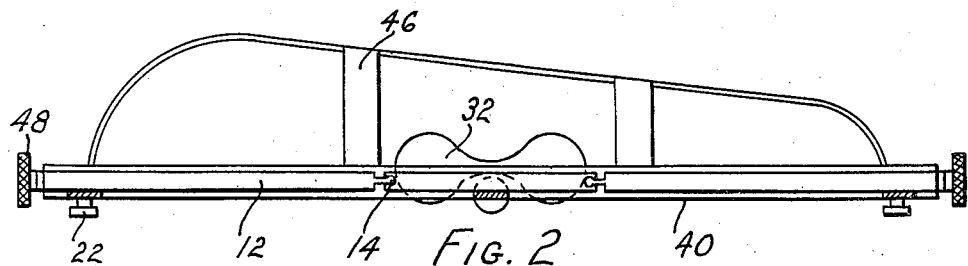
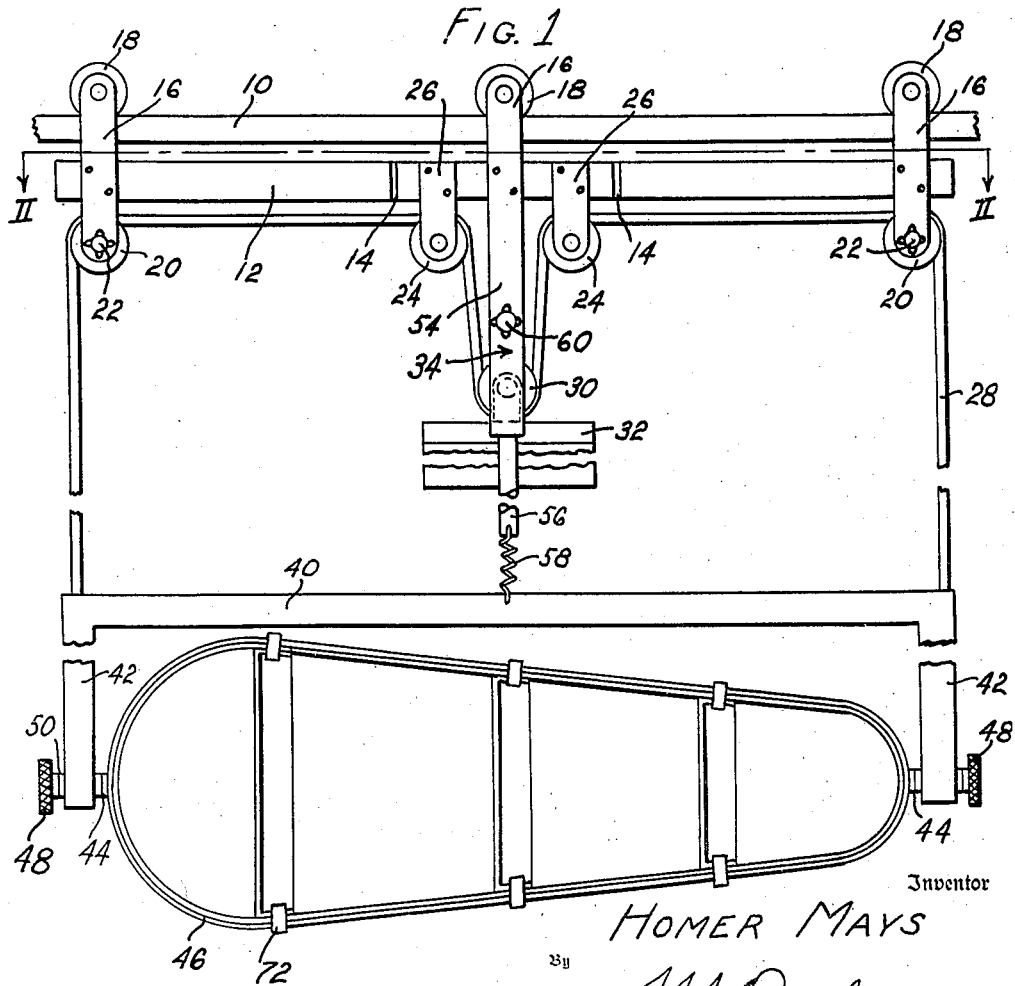
Inventor
HOMER MAYS
By A. H. Oldham, Attorney April 18, 1944.  H. MAYS  2,346,932
SUPPORTING APPARATUS
Filed Dec. 12, 1942  2 Sheets-Sheet 2

Inventor
HOMER MAYS
By
HHOldham Attorney

Patented Apr. 18, 1944

2,346,932

UNITED STATES PATENT OFFICE 2,346,932

SUPPORTING APPARATUS

Homer Mays, North Lima, Ohio

Application December 12, 1942, Serial No. 468,847

9 Claims. (Cl. 29—89)

This invention relates to supporting apparatus, and, more particularly, is concerned with apparatus for facilitating the supporting and handling of various articles during welding or other operations thereon.

Heretofore, it has been well known to position various parts in a jig or fixture to properly hold and support the parts for a welding or other working or assembling operation, and it has even been proposed to employ work manipulators to turn or position the work to facilitate a metal depositing type of welding operation. However, so far as I am aware, such work manipulating means have always comprised a turntable type of apparatus mounted upon a fixed base, and with the welding or other operation being performed by hand with a movable welding torch or rod.

Thus, heretofore in performing spot welding or other operations by means of stationary apparatus it has been necessary to mount the articles or parts to be welded in a suitable jig and to bring the jig and the parts to the spot welding apparatus. Where the articles or parts to be assembled by the spot welding apparatus are large or awkward, often it has been necessary to employ several operators to assist in holding and moving the jig during the spot welding or other assembly operation. This is not only costly, in that a considerable number of operators or helpers are required, but it sometimes results in imperfect welding or other work performance due to the necessity to coordinate the actions of a plurality of people.

It is the general object of my invention to avoid and overcome the foregoing and other difficulties of and objections to known article handling and supporting apparatus by the provision of relatively inexpensive, easily operated, and efficient supporting apparatus for facilitating the handling of parts, articles, or other work up to relatively large sizes by a single operator during a spot welding or other like operation.

Another object of my invention is to provide means for supporting and counterbalancing the weight of parts to be assembled, and while supported in a jig, so that the assembly of parts in the jig can be readily moved in substantially any direction under the complete control of a single machine operator to thereby facilitate a stationary machine spot welding operation or the like.

Another object of my invention is to provide article supporting means which can be readily adjusted to handle any one of a variety of articles and to support them for rotation about an axis and for tilting movement in one or more directions at right angles to the axis.

Another object of my invention is to provide apparatus of the character described and wherein and whereby articles of odd shape and of different weight on each end can be supported freely and in substantially a counterbalanced manner to simplify performing work thereon.

Figure 4:
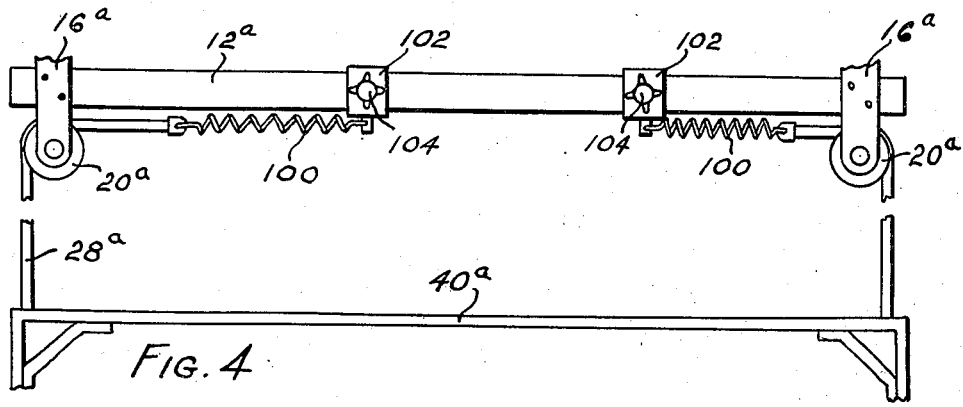
Figure 6:
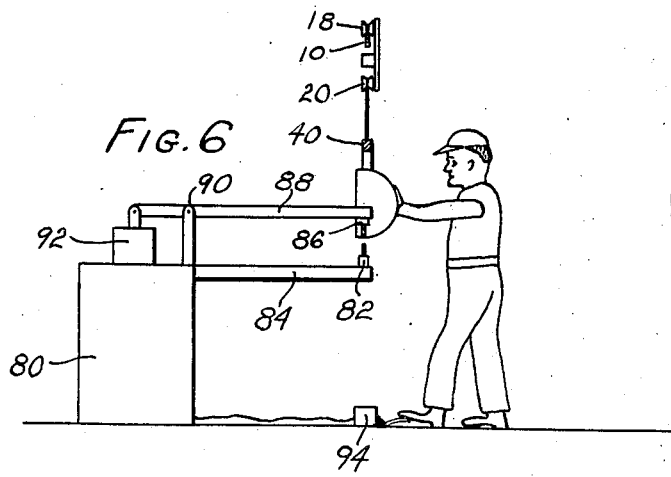
Figure 5:
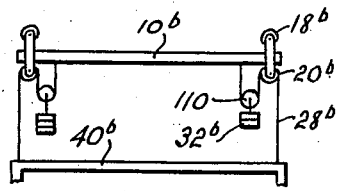

For a better understanding of my invention reference should be had to the accompanying drawings wherein Fig. 1 is a side elevation, partly broken away, of apparatus comprising one embodiment of my invention; Fig. 2 is a fragmentary plan view of the apparatus shown in Fig. 1, and taken substantially on line II—II of Fig. 1; Fig. 3 is a perspective view of the work piece assembled with the assistance of the apparatus of Figs. 1 and 2; Fig. 4 is a fragmentary view similar to Fig. 1, but of another embodiment of my invention; Fig. 5 is a view similar to Figs. 1 and 4, but on a smaller scale, and illustrating still another embodiment of my invention; and Fig. 6 is a diagrammatic view illustrating the manner in which the supporting apparatus of my invention is employed in conjunction with a stationary spot welding machine.

Having particular reference to the embodiment of my invention illustrated in Figs. 1 to 3, the numeral 10 indicates a monorail, or other suitable overhead track means and adapted to slidably support a carriage. The carriage comprises a body or frame 12 which is conveniently articulated, as by vertical hinges 14, whereby the carriage body can be readily turned about relatively sharp bends in the rail 10. Secured to the carriage body 12 are upperly extending brackets 16 adapted to support grooved wheels 18 in cantilever bearings so that the wheels 18 will have rolling engagement with the rail 10.

The brackets 16 at the end of the carriage body 12 are conveniently extended down below the bottom of the carriage body and support pulleys 20 in suitable cantilever bearings supporting the pulleys 20 so that the degree of resistance to turning of the pulleys can be varied, for example, by the provision of readily adjusted knobs 22. Associated with the pulleys 20 are pulleys 24 which are carried in cantilever bearings in downwardly extending brackets 26 secured adjacent the center of the carriage body 12.

Trained over the pulleys 20 and 24 is a flexible rope or cable 28 which near its center extends around a pulley 30 journalled upon a weight 32 which is advantageously made in the form of a figure 8 or other shape whereby it will not interfere with post means indicated generally by the numeral 34 and hereinafter described. The ends of the flexible cable 28 are secured to a frame 40 having an inverted U shape. The frame 40 includes downwardly extending arms 42 which rotatably journal trunnions 44 carried at the end of a jig or fixture 46. Screw knobs 48 on the ends of the trunnions 44 and associated spring washers 50 may be employed to give a desired tension on the trunnions to resist the turning of the jig 46 thereon.

In order to assist in holding the frame 40 and the jig 46 in substantially the desired position during operations upon the work piece or pieces held in the jig, the central bracket 16 may be formed integrally with a downwardly extending tube 54 which slidably receives in telescoping relation a post 56 the lower end of which is connected resiliently, as by a spring 58, with the center of the frame 40. A hand operated cam or screw knob 60 may be provided to lock the post 56 in the tube 54 in any desired vertical position.

Having reference now to the articles, parts, or work pieces operated upon by the apparatus embodiment of my invention just described, from Fig. 3 it will be recognized that the work piece illustrated takes the form of one half of a streamlined gasoline tank for airplane use, and, specifically, an airplane gas tank adapted to be carried outside the normal contour of the airplane. The half gasoline tank shown in Fig. 3 includes a pressed body portion 66 of Duralumin or other light weight alloy sheet, and the thickness of the sheet has been exaggerated in the drawings to better illustrate the construction. Positioned within the hollow shell of the press body are a plurality, for example three, of cross tie or bulkhead members also made from light pressed metal sheet and indicated by the numerals 68. Each bulkhead member has a right angle flange by which the bulkhead is spot welded, at a plurality of points 70, to the body of the tank. The jig 46 receives the tank body 66 and the bulkheads 68 and positions and supports them in properly assembled relation whereby subsequent spot welding secures the bulkheads to the tank body. The bulkheads 68 usually have openings for the passage of gasoline between the bulkheads which openings have not been illustrated in order to maintain the simplicity of the drawings. The jig or fixture 46 takes any one of a variety of forms to adequately perform the function just described, but conveniently comprises sheets, straps, angle iron or other light or strong material either made as a frame work lattice or as a socket pressed from sheet metal and adapted to receive the body 66 and other parts of the work to be supported. In any event, regardless of the exact form of the jig 46 some suitable lock means, such as indicated by the numeral 72, may and are preferably employed to hold the parts of the work piece in properly aligned relation in the jig 46.

Fig. 6 of my invention illustrates diagrammatically a stationary spot welding apparatus 80 of the type having a stationary die or electrode 82 supported on a long cantilever arm 84 and a movable die or electrode 86 supported upon a long arm 88 pivoted at 90 and operated by a pressure cylinder 92 controlled by a foot treadle 94. The spot welding apparatus is positioned with the electrodes 82 and 86 almost directly beneath the rail 10 so that the work pieces to be welded can be supported in the jig of the apparatus and readily moved on the rail 10 into operating relation with the electrodes 82 and 86, all in the manner generally shown in Fig. 6.

More particularly, in the operation of the article supporting apparatus the body 66 and the bulkheads 68 are first positioned in the jig 46 and locked in position by the quickly releasable clamps 72. Thereafter, the frame 40 is raised or lowered after releasing the lock 60 of the post assembly 34, and this operation is readily accomplished inasmuch as the weight 32 substantially counterbalances the weight of the frame 40, the jig 46 and the work pieces carried by the jig. The weight 32 may be made in sections so that a greater or less number of sections may be mounted in the weight to form the proper counterbalance. Thereafter, the lock 60 of the post assembly 34 is tightened to clamp the post 56 in the tube 54 so that the frame 40 is given a certain resilient steadiness. Now the knobs 48 are tightened somewhat so that the jig 46 will turn about the trunnions 44 but only when the operator applies a desired turning force to the jig. Also, the knobs 22 on the pulleys 20 can be adjusted to provide a desired tension on the pulleys holding them against turning.

With the work supporting apparatus adjusted as just described to best adapt it to particular work pieces and a particular working operation, it will be recognized that the work can be given a rotary movement about the longitudinal axis provided by the trunnions, and the work, jig 46, and frame 40 can be tilted with respect to the horizontal so that either end of the work piece is held high or low. The horizontal tilting action is achieved by the movement of the cable 28 over the pulleys 20 and is compensated for by the pulley system and the weight 32. If one end of the work piece is somewhat heavier than the other the tension on the associated pulley 20 as provided by the tensioning knob 22 may be made greater at the heavy end of the work piece. Further, the frame 40 and associated jig and work piece can be turned about a vertical pivot provided by the post assembly 34.

Thus, a combination of movements is provided whereby it is a simple matter for a single operator to support and handle even a relatively large and awkward work piece or assembly of pieces so as to best position the same for performing one or more working operations thereon. I have specifically illustrated my supporting apparatus as being employed in conjunction with a stationary spot welding apparatus, and it has been found particularly advantageous when employed in conjunction therewith, but it should be expressly understood that my improved apparatus can be adapted to handle and support a work piece or pieces for a wide variety of operations other than spot welding thereon.

Turning now to the embodiment of my invention illustrated in Fig. 4 of the drawings, the numeral 12a indicates a carriage body of rigid character adapted to be supported only at its ends and by brackets 16a and suitable grooved wheels on a overhead rail or rails. The brackets 16a extend downwardly below the carriage body 12a and journaled pulleys 20a. Flexible cables 28a extend over the pulleys 20a and downwardly to a frame 40a adapted to support, as already described, a suitable jig or fixture member. The other ends of the flexible cables 28a are secured to tension springs 100 fastened in turn to slides 102 adapted to be locked in any adjusted position along the carriage body 12a by screw knobs 104. The height of the frame 40a with respect to the carriage body 10a can be adjusted by suitably positioning the slides 102, and if the work piece or pieces to be handled by the apparatus are considerably heavier at one end than at the other, positioning one slide 102 at a greater distance from its associated pulley will cause the associated spring to be tensioned to a greater amount to compensate for the heavier weight at one end of the work supported.

In Fig. 5 I have illustrated still another embodiment of my invention as including a carriage body 12b adapted to be supported upon an overhead rail by grooved rollers 18b journalled at the ends of the carriage, and with pulleys 20b journalled beneath the ends of the carriage body 12b having flexible cables 28b trained thereover and extending down to a suitable frame 40b. The cables also extend over pulleys 110 in the manner shown in Fig. 5 and the ends of the cables 28b remote from the frame 40b are fastened to the carriage body 12b. The pulleys 110 are journalled upon suitable arms adapted to support one or more weights 32b. The apparatus of Fig. 5 is adapted to provide a complete counterbalance for a work piece or work pieces regardless of the height at which the work piece must be positioned and regardless of whether the work piece is heavier at one end than at the other. The frame 40b rotatably supports a suitable jig, all as already described in detail above.

The operation of the supporting apparatus embodiments shown in Figs. 4 and 5 of the drawings is generally similar to that heretofore described and illustrated in Figs. 1 to 3. However, the post assembly of the apparatus of Figs. 1 to 3 is omitted from the forms of the invention shown in Figs. 4 and 5 and this provides for somewhat greater flexibility of the work piece or pieces with respect to the overhead rail.

From the foregoing it will be recognized that the various objects of my invention have been achieved by the provision of relatively inexpensive, easily operated, and efficient work supporting apparatus whereby relatively large, awkward, and/or heavy work pieces or work of a wide variety of forms and types can be conveniently and accurately supported and handled by a single operator to facilitate the performance of one or more operations thereon, for example, spot welding operations upon a stationary machine. The apparatus is readily adapted to use with work pieces which are heavier at one end than at the other and by suitable designing associated jigs or work fixtures a large variety of work pieces can be handled merely by substituting one jig or fixture for another and without changing the frame or counterbalancing mechanism of my improved apparatus. The apparatus of my invention adapts itself to quantity production operations on successive machines or at successive stations with the work piece or pieces being carried on the overhead conveyor rails from one end of a plant to the other, and with only a single operator being required to manipulate and work on the work piece or pieces at each stationary machine or working station. My improved apparatus is inexpensive to construct, includes only a relatively small number of working parts of inexpensive initial cost, and maintenance and repair of my apparatus is negligible.

While in accordance with the patent statutes I have specifically illustrated and described my advance in the art, it should be particularly understood that I am not to be limited thereto or thereby, but that the scope of my invention is defined in the appended claims.

I claim:

1. Article supporting and handling apparatus comprising a work receiving jig, quickly releasable clamp means for holding work in the jig, trunnions at the ends of the jig for supporting it for rotation about an axis, a frame rotatably receiving the trunnions and supporting the jig, means for varying the ease with which the trunnions will rotate in the frame, overhead means, a plurality of flexible cables extending between the overhead means and the frame, adjustable tension pulleys supporting the cables, and counterbalancing means associated with the cables whereby the frame and jig can be tilted or swung to best position the work for any given operation thereon.

2. Article supporting and handling apparatus comprising a work receiving jig, trunnions at the ends of the jig for supporting it for rotation about an axis, a frame rotatably receiving the trunnions and supporting the jig, overhead means, a plurality of flexible cables extending between the overhead means and the frame, pulleys supporting the cables, and counterbalancing means associated with the cables whereby the frame and jig can be tilted or swung to best position the work for any given operation thereon.

3. Article supporting and handling apparatus comprising a work receiving jig, quickly releasable clamp means for holding work in the jig, trunnions at the ends of the jig for supporting it for rotation about an axis, a frame rotatably receiving the trunnions and supporting the jig, means for varying the ease with which the trunnions will rotate in the frame, articulated overhead means comprising a plurality of parts connected together with vertically extending hinges, a plurality of flexible cables extending between the overhead means and the frame, adjustable tension pulleys supporting the cables, counterbalancing means associated with the cables whereby the frame and jig can be tilted or swung to best position the work for any given operation thereon, a telescoping post assembly rigidly secured to the center of the overhead means and extending downwardly, means resiliently securing the lower end of the post assembly to the frame, and means for locking the post assembly in a selected telescoping position.

4. Article supporting and handling apparatus comprising a work receiving jig, quickly releasable clamp means for holding work in the jig, trunnions at the ends of the jig for supporting it for rotation about an axis, a frame rotatably receiving the trunnions and supporting the jig, means for varying the ease with which the trunnions will rotate in the frame, an articulated overhead means comprising a plurality of parts connected together with vertically extending hinges, a plurality of flexible cables extending between the overhead means and the frame, pulleys supporting the cables, counterbalancing means associated with the cables whereby the frame and jig can be tilted or swung to best position the work for any given operation thereon, a telescoping post assembly rigidly secured to the center of the overhead means and extending downwardly, means pivotally securing the lower end of the post assembly to the frame, and means for locking the post assembly in a selected telescoping position.

5. Article supporting and handling apparatus comprising a work receiving jig, trunnions at the ends of the jig for supporting it for rotation about an axis, a frame rotatably receiving the trunnions and supporting the jig, an articulated overhead means comprising a plurality of parts connected together with vertically extending hinges, a plurality of flexible cables extending between the overhead means and the frame, pulleys supporting the cables, counterbalancing means associated with the cables whereby the frame and jig can be tilted or swung to best position the work for any given operation thereon, a telescoping post assembly rigidly secured to the center of the overhead means and extending downwardly, means pivotally securing the lower end of the post assembly to the frame, and means for locking the post assembly in a selected telescoping position.

6. Article supporting and handling apparatus comprising a work receiving jig, trunnions at the ends of the jig for supporting it for rotation about an axis, a frame rotatably receiving the trunnions and supporting the jig, overhead means, a plurality of flexible cables extending between the overhead means and the frame, pulleys supporting the cables, counterbalancing means associated with the cables whereby the frame and jig can be tilted or swung to best position the work for any given operation thereon, a telescoping post assembly rigidly secured to the center of the overhead means and extending downwardly, means pivotally securing the lower end of the post assembly to the frame, and means for locking the post assembly in a selected telescoping position.

7. Article supporting and handling apparatus comprising a working receiving jig, quickly releasable clamp means for holding work in the jig, trunnions at the ends of the jig for supporting it for rotation about an axis, a frame rotatably receiving the trunnions and supporting the jig, means for varying the ease with which the trunnions will rotate in the frame, overhead means, counterbalancing means connecting the overhead means to both ends of the frame whereby the frame and jig can be tilted or swung to best position the work for any given operation thereon, a telescoping post assembly rigidly secured to the center of the carriage and extending downwardly, means pivotally securing the lower end of the post assembly to the frame, and means for locking the post assembly in a selected telescoping position.

8. Handling and supporting apparatus comprising a frame, a work receiving jig rotatably carried by the frame, overhead means, pulleys on the overhead means, a flexible cable secured to one end of the frame extending over the pulleys and having its other end secured to the other end of the frame, a counterweight of adjustable size, a pulley supporting the counterweight and in turn supported on the cable between the pulleys carried by the overhead means, and adjustable post means for preventing out of line movement between the overhead means and the frame.

9. Handling and supporting apparatus comprising a frame, a work receiving jig rotatably carried by the frame, overhead means, pulleys on the overhead means, a flexible cable secured to one end of the frame extending over the pulleys and having its other end secured to the other end of the frame, a counterweight of adjustable size, and a pulley supporting the counterweight and in turn supported on the cable between the pulleys carried by the overhead means.

HOMER MAYS.